ARTICLE OF REPOSE FOR SUPPORTING THE BODY OF A PERSON

Original Filed Oct. 22, 1952 2 Sheets-Sheet 1

INVENTOR
ANTON LORENZ
BY
ATTORNEY

ARTICLE OF REPOSE FOR SUPPORTING THE BODY OF A PERSON

Original Filed Oct. 22, 1952 2 Sheets-Sheet 2

INVENTOR
ANTON LORENZ
BY
ATTORNEY

United States Patent Office

Re. 24,760

Reissued Dec. 29, 1959

24,760

ARTICLE OF REPOSE FOR SUPPORTING THE BODY OF A PERSON

Anton Lorenz, Boynton Beach, Fla.

Original No. 2,760,555, dated August 28, 1956, Serial No. 316,197, October 22, 1952. Application for reissue August 26, 1958, Serial No. 757,890

16 Claims. (Cl. 155—106)

Matter enclosed in heavy brackets [ ] appears in the original patent but forms no part of this reissue specification; matter printed in italics indicates the additions made by reissue.

This invention relates to articles of furniture, and more particularly to articles of furniture wherein the back-rest and seat [form movable links of a constrained linkage including said back-rest and seat, a chain of connecting links and guiding means as] *are movably mounted on a stationary support and are operatively connected with a constrained linkage comprising* movable links and a portion of the support as stationary link means.

An object of the present invention is to provide a convenient controlling mechanism for a leg-rest swingably mounted on the seat of a reclining article of furniture of above described type, by means of which the leg-rest may be propelled forwardly, and upwardly at a great initial speed, when the movable members of the article of furniture are swung from their sitting position into a reclined position.

Figure 1:
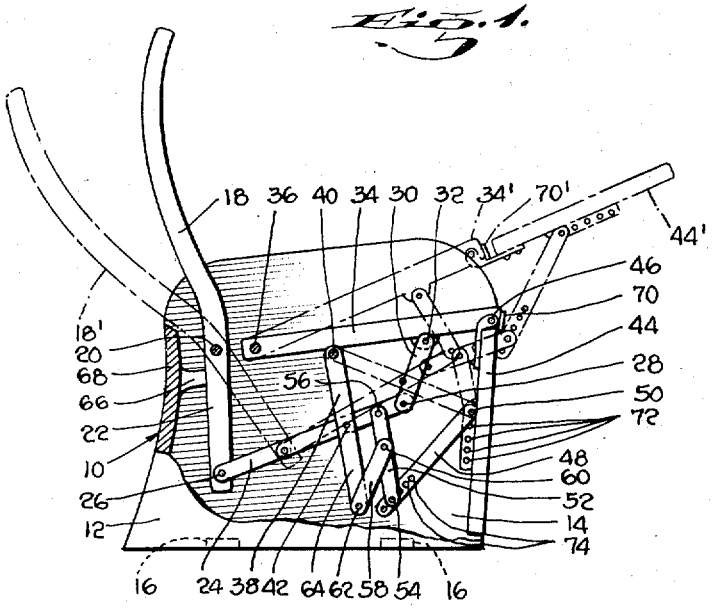
Figure 2:
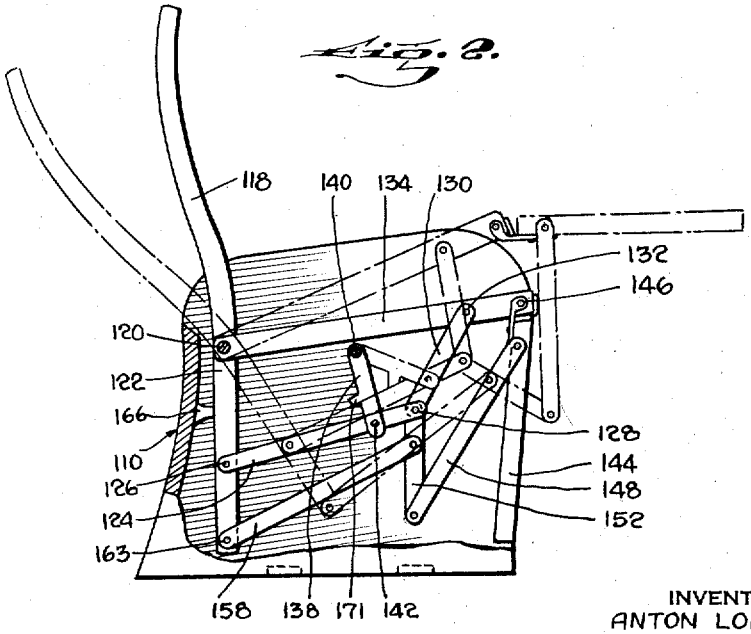
Figure 3:
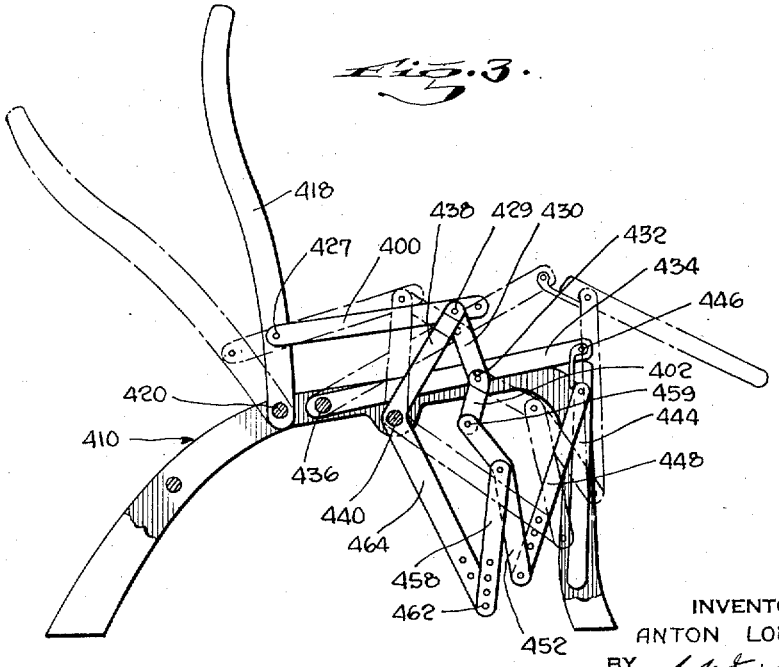

Other objects and structural details will be apparent from the following description when read in conjunction with the accompanying drawings, forming part of this specification, wherein:

Fig. 1 is a side elevational view of a chair according to the invention, a portion of a side frame being broken away, Fig. 2 is a side elevational view of another embodiment of a chair according to the invention, a portion of a side frame being broken away, and Fig. 3 is a side elevational view of still another embodiment of a chair according to the invention, a portion of a side frame being broken away.

Referring now to Fig. 1, 10 generally indicates a support including the side frames 12 and 14 connected with each other by cross bars 16. The side frames include the arm-rests of the chair.

A back-rest 18 swingably mounted on the support 10 at 20 includes a downward extension 22. One end of a *first or* lower connecting link 24 is pivoted to said downward extension 22 of the back-rest 18 at 26. The other end of said lower connecting link 24 is pivoted at 28 to one end of a front connecting link 30, the other end of which is pivoted at 32 to a seat 34 swingably mounted on the support 10 at 36. A guiding link 38 swingably mounted on the support 10 at 40 is pivoted to the lower connecting link 24 at 42. [Thus, the downward extension 22 of the back-rest 18, the chain of connecting links 24, 30, the seat 34 and the guiding link 38 form movable links of a constrained linkage wherein the portions of the support between the pivots 36 and 20 and 36 and 40 constitute the stationary link means.] *This construction includes a basic constrained four-bar linkage which includes as its stationary element or link the portion of the support between the pivots* 20 *and* 40 *and three movable links, one of which comprises the downward extension 22 of the back rest 18, another the guide link 38 and a third the connecting link 24 pivoted to the extension 22 and to the guide link 38. It will be seen that the members 22 and 38 are pivoted at the spaced points 20 and 40 of the support (or stationary link) so that a true constrained linkage is provided which enables controlled movements to be transmitted from the back rest to the seat by means of the connecting or seat link 30 which is pivoted at one end to the connecting link 24 and at the other end to the seat 34.*

A leg-rest 44 swingably mounted on the front portion of the seat 34 at 46 is in pivotal connection with one end of a controlling link 48 at 50. The other end of said controlling link 48 is pivoted to the lower end of a controlling arm 52 at 54. The upper end of said controlling arm 52 is pivoted to the lower connecting link 24 at 56. One end of a controlling bar 58 is pivoted to the controlling arm 52 at 60, the other end of said controlling bar 58 is pivoted at 62 to an extension 64 of the guiding link 38 projecting beyond the pivotal connection 42 of the latter with the lower connecting link 24.

*It will be seen that the guide link* 38, *of which extension 64 is an integral part, first or lower link 24, controlling arm 52 and controlling bar* 58 *constitute the four elements of a quadric linkage which is based upon the constrained linkage above described and which includes an element of the constrained linkage pivoted to the stationary support, in this embodiment of the invention, the guide link 38. Another of the links of the quadric linkage which is also an element of the four-bar constrained linkage is the first or lower link 24. The leg rest is operatively connected to a portion of the quadric linkage other than the links 38 and 24, in the example illustrated in Fig. 1, to the controlling arm 52. By changing the relative lengths of the links of the quadric linkage, the ratio of movement of the leg rest in relation to the support and seat may be varied. The fact that the quadric linkage is based upon and includes certain elements of the basic four-bar linkage incuding an element of said linkage which is pivoted to the stationary support results in an organization in which the quadric linkage is controlled and guided so that it may be effectively to move the leg rest and to sustain it in desired predetermined positions.*

The sitting position of the movable members of the chair, shown in full lines, is limited by a stop 66 arranged on the rear wall 68 of the support 10 for co-operation with the downward extension 22 of the back-rest 18. When a person resting on the chair leans the weight of his body against the back-rest 18, the movable members of the chair may be readily brought into a reclined position, for example the extreme reclined position shown in dash and dot lines, which is limited by a stop 70 arranged on the front end of the seat 34 for co-operation with a portion of the leg-rest 44. In said extreme reclined position, the back-rest, seat and leg-rest assume the positions 18', 34', 44'.

Owing to the controlling mechanism *including links 24, 38,* 58, 52, 48, for the leg-rest 44 as described above, the leg-rest 44 is propelled forwardly and upwardly at a comparatively great initial speed during the movement of the movable members of the chair from the sitting position into a reclined position, so that the leg-rest is already in a rather high position when the back-rest and seat are only slightly inclined.

The position of the pivotal connections 50 and 54 of the controlling link 48 may be altered for adjusting purposes; there is a series of holes 72 on the leg-rest 44 capable of selective engagement with the pivot 50 and there is a series of holes 74 on the controlling link 48 capable of selective engagement with the pivot 55.

According to the embodiment shown in Fig. 2, the back-rest 118 and seat 134 are swingably mounted on the support 110 at 120. Again the downward extension 122 of the back-rest 118 is pivoted at 126 to one end of a lower connecting link 124, the other end of which is pivoted at 128 to a front connecting link 130 pivoted to the seat at 132. A guiding link 138 swingably mounted on the support 110 at 140 is pivoted to the lower connecting link 124 at 142.

The controlling mechanism 158, 152, 148 for the leg-rest 144 swingably mounted on the seat 134 at 146, however, is connected with the link system of the chair in a different way. The controlling arm 152 of said controlling mechanism 158, 152, 148, is pivoted to the lower connecting link 124, at 128 in coaxial alignment with the pivotal connection between said lower connecting link 124 and the front connecting link 130. Furthermore, the controlling bar 158 of said controlling mechanism 158, 152, 148, is pivoted to the downward extension 122 of the back-rest at 163.

*In this construction as in the form of invention shown in Fig. 1, it will be seen that there is a basic four-bar linkage in which the part of the stationary support between the pivots 120 and 140 forms a stationary link and which includes three movable links, 122, 124 and 138. Two of these links, 122 and 138, are pivoted at the ends of what may be termed the stationary link 120—140. The link 124 constitutes a connecting link. The lower extension of the back rest extension 122 and the connecting link 124 in combination with the controlling arm 152 and the controlling bar 158 constitute the four links of a controlled quadric linkage which in turn produces the movement of the leg rest.*

The sitting position of the movable members shown in full lines is limited by the stop 166 arranged on the rear wall of the support 110 for cooperation with the downward extension 122 of the back-rest 118. The extreme reclined position of the movable members of the chair shown in dash and dot lines is limited by a stop 171 arranged on the guiding link 138 for cooperation with the lower connecting link 124.

According to the embodiment shown in Fig. 3, the back-rest 418 and the seat 434 are swingably mounted on the support 410 at the points 420 and 436, respectively. The rear end of a top connecting link 400 is pivoted to the back-rest 418 at 427. Said top connecting link 400 is pivotally connected with the upper ends of a front connecting link 430 and of a guiding link 438 at 429. The front connecting link 430 is pivoted to the seat 434 at 432 and the guiding link 438 is pivoted to a lug of the support 410 at 440. The front connecting link 430 has an extension 402 projecting beyond the pivotal connection 432 between the seat 434 and the front connecting link 430. The guiding link 438 has an extension 464 projecting beyond the pivotal connection 440 of the guiding link 438 with the support 410.

The controlling bar 458 of the controlling mechanism 458, 452, 448 for the leg-rest 444 swingably mounted on the seat 434 at 446 is pivoted to the extension 464 of the guiding link 438 at 462. The controlling arm 452 of said controlling mechanism 458, 452, 448 is pivoted at 459 to the extension 402 of the front connecting link 430.

I have described preferred embodiments of my invention, but it is understood that this disclosure is for the purpose of illustration and that various omissions or changes in shape, proportion and arrangement of parts, as well as the substitution of equivalent elements for those, herein shown and described may be made without departing from the spirit and scope of the invention as set forth in the appended claims.

For example, the controlling arm of the controlling mechanism for the leg-rest could also be pivoted to an intermediate point of the front connecting link between the pivotal connections of the latter with the seat and the adjoining link of the chain of connecting links.

Moreover, each of the embodiments shown in the drawings may be equipped with locking means for holding the movable members of the chair in any desired position.

What I claim is:

1. An article of repose for supporting the body of a person, comprising in combination: supporting means, a constrained linkage having stationary link-means and a plurality of movable links, said stationary link-means being included in said supporting means, said movable links including a seat member, a back-rest member, guiding means and a chain of connecting links including a first connecting link at one end of the chain and a front connecting link at the other end of the chain, said guiding means being connected to said supporting means and engaged with at least one of said connecting links, said first connecting link being pivoted to the structure of said back-rest member, said front connecting link being pivoted to the front portion of said seat-member, means pivotally connecting at least one of said back-rest- and seat-members with said supporting means, a leg-rest swingably mounted on the front portion of said seat, a controlling arm pivoted to the structure of a connecting link of said chain of connecting links, a controlling bar pivoted at one of its end portions to a movable link of said constrained linkage and pivoted at its other end portion to said controlling arm, the effective length of said movable link from its pivoted end to its point of connection with said controlling bar being larger than the effective length of said controlling arm between its pivots connecting same to said controlling bar and to said connecting link, and controlling means interposed between said controlling arm and said leg-rest for effecting movement of the latter in coordination with said controlling arm.

2. In an article of repose as claimed in claim 1, said first connecting link and said front connecting link of the chain of connecting links being pivotally connected with each other, and said controlling arm being pivoted to said connecting links in coaxial alignment with the pivotal connection between said connecting links.

3. In an article of repose as claimed in claim 1, said controlling arm being pivoted to the structure of said front connecting link.

4. In an article of repose as claimed in claim 1, said front connecting link having an extension, said extension projecting beyond the pivotal connection of said front connecting link with said seat, and said controlling arm being pivoted to said extension of the front connecting link.

5. In an article of repose as claimed in claim 1, said guiding means including a guiding link pivotally connected with the supporting means at one of its ends and pivotally connected with at least one of said connecting links at a point spaced from its pivotal connection with the supporting means, and said controlling bar being pivoted to the structure of said guiding link.

6. In an article of repose as claimed in claim 1, said guiding means including a guiding link pivotally connected with the supporting means at one of its ends and pivotally connected with at least one of said connecting links at a point spaced from its pivotal connection with the supoprting means, said guiding link having an extension, said extension projecting beyond the pivotal connection of the guiding link with the connecting link, and said controlling bar being pivoted to said extension of the guiding link.

7. In an article of repose as claimed in claim 1, said guiding means including a guiding link pivotally connected with the supporting means and pivotally connected with at least one of said connecting links at a point spaced from its pivotal connection with the supporting means, an extension on said guiding link, said extension projecting beyond the pivotal connection of the guiding link with the supporting means, and said controlling bar being pivoted to said extension of the guiding link.

8. In an article of repose as claimed in claim 1, said controlling bar being pivoted to the structure of said back-rest member.

9. In an article of repose as claimed in claim 1, said back-rest member including a downward extension, and said controlling bar being pivoted to said downward extension of the back-rest member.

*10. An article of repose for supporting the body of a person comprising a stationary support, a back rest and a seat swingably mounted on said support, a constrained four-bar linkage comprising two links pivoted to the stationary support at spaced points, the part of said support between said pivot points constituting the stationary link of said constrained linkage, and a connecting link separate from and movable with respect to the seat pivoted at spaced points to points on said first two links spaced from the points at which said links are pivoted to said stationary support, an operative connection between said back rest and one of the movable links of said constrained linkage, a leg rest connected to a movable part of the structure and movable from a position below said seat to a position extending in front of the seat, a quadric linkage including as two of its elements two of the movable links of said constrained linkage, one of said links being an element of the constrained linkage which is pivoted to the stationary support, the other of said elements being said connecting link, the third and fourth links of said quadric linkage comprising a controlling arm and controlling bar pivoted to each other and pivoted respectively at points spaced from the point at which they are pivoted to each other to the connecting link of the constrained linkage and to a link of said linkage pivoted to the stationary support, and an operative connection from at least one of said third and fourth links of said quadric linkage to a region of said leg rest spaced from the part of the leg rest having said connection with the movable element to which it is connected, whereby movement of said back rest causes controlled movement of the quadric linkage and of the leg rest, the ratio of movement of the leg rest with respect to the stationary support being controlled by the proportions of the links constituting said quadric linkage.*

*11. An article of repose as claimed in claim 10 in which one of the two links pivoted to the stationary support is pivoted to such support at a region towards the rear of the stationary support and the second of said two links is pivoted to the stationary support at an intermediate portion of said stationary support in front of the pivotal point of said first link, the forward link of said two links constituting an element of said quadric linkage.*

*12. An article of repose as claimed in claim 10 in which the back rest and seat are both swingably mounted on said support and relatively movable and there is an operative connection from a movable element of said four-bar constrained linkage to said seat for moving the seat when the back rest is moved.*

*13. An article of repose as claimed in claim 12 in which the stated operative connection is a link pivoted to the connecting link of the constrained linkage and to the seat at a point spaced from its point of swingable connection to the stationary support.*

*14. An article of repose as claimed in claim 10 in which the leg rest is pivoted to the front portion of the seat.*

*15. An article of repose for supporting the body of a person comprising a stationary support, a back rest and a seat swingably mounted on said support, a constrained four-bar linkage comprising two links pivoted to the stationary support at spaced points, the part of said support between said pivot points constituting the stationary link of said constrained linkage, and a connecting link separate from and movable with respect to the seat pivoted at spaced points to points on said first two links spaced from the points at which said links are pivoted to said stationary support, the rear link of said two links pivoted to the stationary support constituting a rigid extension of said back rest, a leg rest connected to a movable part of the structure and movable from a position below said seat to a position extending in front of the seat, a quadric linkage including as two of its elements two of the movable links of said constrained linkage, one of said links being an element of the constrained linkage which is pivoted to the stationary support, the other of said elements being said connecting link, the third and fourth links of said quadric linkage comprising a controlling arm and controlling bar pivoted to each other and pivoted respectively at points spaced from the points at which they are pivoted to each other to the connecting link of the constrained linkage and to a link of said linkage pivoted to the stationary support, and an operative connection from at least one of said third and fourth links of said quadric linkage to a region of said leg rest spaced from the part of the leg rest having said connection with the movable element to which it is connected, whereby movement of said back rest causes controlled movement of the quadric linkage and the leg rest, the ratio of movement of the leg rest with respect to the stationary support being controlled by the proportions of the links constituting said quadric linkage.*

*16. An article of repose as claimed in claim 15 in which the first element of said quadric linkage comprises a part of said link forming a rigid extension of the back rest, the controlling bar constituting the fourth link of said quadric linkage being pivoted at its rear end to the lower part of said link constituting the extension of the back rest.*

References Cited in the file of this patent or the original patent

| | | |
|---|---|---|
| 667,363 | Geiss | Feb. 5, 1901 |
| 1,534,272 | Koken | Apr. 21, 1925 |
| 2,472,854 | Lorenz | June 14, 1949 |
| 2,478,769 | Lorenz | Aug. 9, 1949 |
| 2,541,938 | Rideout | Feb. 13, 1951 |
| 2,576,466 | Lorenz | Nov. 27, 1951 |
| 2,672,919 | Luckhardt | Mar. 23, 1954 |
| 2,746,521 | Lorenz | May 22, 1956 |
| 2,760,554 | Lorenz | Aug. 28, 1956 |
| 2,801,675 | Krikorian | Aug. 6, 1957 |

FOREIGN PATENTS

| | | |
|---|---|---|
| 19,394 | Sweden | May 13, 1905 |
| 205,484 | Switzerland | Sept. 1, 1939 |
| 220,033 | Germany | Mar. 14, 1910 |
| 632,070 | Great Britain | Nov. 15, 1949 |